United States Patent
Shinozaki et al.

(10) Patent No.: US 12,431,512 B2
(45) Date of Patent: Sep. 30, 2025

(54) FUEL CELL SEPARATOR

(71) Applicant: TOYOTA SHATAI KABUSHIKI KAISHA, Kariya (JP)

(72) Inventors: Yoshinori Shinozaki, Kariya (JP); Satoshi Futami, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 474 days.

(21) Appl. No.: 17/791,470

(22) PCT Filed: Dec. 2, 2020

(86) PCT No.: PCT/JP2020/044844
§ 371 (c)(1),
(2) Date: Jul. 7, 2022

(87) PCT Pub. No.: WO2021/199499
PCT Pub. Date: Oct. 7, 2021

(65) Prior Publication Data
US 2023/0038586 A1 Feb. 9, 2023

(30) Foreign Application Priority Data

Mar. 30, 2020 (JP) ................. 2020-060916

(51) Int. Cl.
*H01M 8/026* (2016.01)
*H01M 8/0265* (2016.01)
(52) U.S. Cl.
CPC ......... *H01M 8/026* (2013.01); *H01M 8/0265* (2013.01)
(58) Field of Classification Search
None
See application file for complete search history.

(56) References Cited

U.S. PATENT DOCUMENTS 6,663,997 B2 * 12/2003 Dong ................. H01M 8/0263
429/514
10,340,532 B2  7/2019 Okabe et al.
(Continued)

FOREIGN PATENT DOCUMENTS

CN          1360740 A      7/2002
CN        108028397 A      5/2018
(Continued)

OTHER PUBLICATIONS

CN Office Action dated Feb. 21, 2024 as received in Application No. 202080091313.6.
(Continued)

*Primary Examiner* — Alix E Eggerding
(74) *Attorney, Agent, or Firm* — Maschoff Brennan

(57) ABSTRACT

A separator for a fuel cell includes protrusions spaced apart from each other. The protrusions are configured to contact a power generation portion. The separator includes a gas passage that extends between two adjacent ones of the protrusions. The gas passage includes ribs that protrude toward the power generation portion. The ribs include first ribs spaced apart from each other in an arrangement direction of the protrusions and a second rib located between adjacent ones of the first ribs in the arrangement direction. A downstream end of each of the first ribs includes a separated portion separated from the power generation portion. An upstream end of the second rib includes an inclined portion inclined so as to become closer to the power generation portion toward a downstream side. At least part of the inclined portion is located downstream of at least part of the separated portion.

8 Claims, 6 Drawing Sheets

(56) References Cited

U.S. PATENT DOCUMENTS

| | | | | |
|---|---|---|---|---|
| 2001/0041281 A1* | 11/2001 | Wilkinson | .......... | H01M 8/0258 |
| | | | | 429/480 |
| 2012/0301810 A1 | 11/2012 | Kawajiri et al. | | |
| 2017/0110740 A1 | 4/2017 | Gurney et al. | | |
| 2018/0198153 A1 | 7/2018 | Jung et al. | | |
| 2021/0408558 A1 | 12/2021 | Morozumi et al. | | |
| 2023/0034374 A1* | 2/2023 | Shinozaki | ........... | H01M 8/0265 |

FOREIGN PATENT DOCUMENTS

| | | |
|---|---|---|
| JP | 2004-241141 A | 8/2004 |
| JP | 2007-220686 A | 8/2007 |
| JP | 2011-150801 A | 8/2011 |
| JP | 2019-204659 A | 11/2019 |
| WO | 0201661 A1 | 1/2002 |
| WO | 2012035585 A1 | 3/2012 |

OTHER PUBLICATIONS

EPO Extended European Search Report dated Nov. 26, 2024 in application 20928136.9.
KR Office Action dated Mar. 19, 2025 as received in Application No. 10-2022-7022569.

* cited by examiner

Downstream ←——→ Upstream

FUEL CELL SEPARATOR

TECHNICAL FIELD

The present disclosure relates to a separator for a fuel cell.

BACKGROUND ART

Conventionally, polymer electrolyte fuel cells include a stack in which cells are stacked (see, for example, Patent Literature 1). Each cell includes a power generation portion and two metal separators. The power generation portion includes a membrane electrode assembly and is held between the separators. The separators each include projections and recesses that are alternately formed.

The projections and the recesses define a gas passage between each separator and the power generation portion of the cell such that reactant gas flows through the gas passages.

CITATION LIST

Patent Literature

Patent Literature 1: Japanese Laid-Open Patent Publication No. 2019-204659

SUMMARY OF INVENTION

Technical Problem

In the fuel cell, power is generated when reactant gas in the gas passage reaches the power generation portion. Thus, it is preferred that the flow rate of reactant gas be high in the vicinity of the power generation portion in the gas passage. Accordingly, it is desired that the flow speed of reactant gas be increased in the vicinity of the power generation portion in the gas passage.

However, the flow speed of reactant gas in the gas passages is lower in a region in the vicinity of the power generation portion than in a middle region of each projection in its protruding direction. Thus, there is room for improvement to increase the power generating performance of the fuel cell.

It is an objective of the present disclosure to provide a separator for a fuel cell capable of increasing the flow speed of reactant gas in the vicinity of a power generation portion.

Solution to Problem

A first aspect of a separator for a fuel cell that achieves the above-described objective is configured to contact a power generation portion of the fuel cell. The separator includes protrusions that extend in parallel and are spaced apart from each other. The protrusions are configured to contact the power generation portion. The separator includes a gas passage that extends between two adjacent ones of the protrusions along the protrusions. The gas passage is configured to allow reactant gas to flow through the gas passage. An upstream side and a downstream side in a flow direction of the reactant gas flowing through the gas passage are referred to as an upstream side and a downstream side, respectively. The gas passage includes ribs that protrude toward the power generation portion and extend in an extending direction of the gas passage. The ribs include first ribs and a second rib. The first ribs are arranged in parallel and spaced apart from each other in an arrangement direction of the protrusions. The second rib is located between adjacent ones of the first ribs in the arrangement direction. A downstream end of each of the first ribs includes a separated portion separated from the power generation portion. An upstream end of the second rib includes an inclined portion inclined so as to become closer to the power generation portion toward the downstream side. At least part of the inclined portion is located downstream of at least part of the separated portion.

In this structure, reactant gas flows faster when flowing through the space between the first ribs in each gas passage. The reactant gas flowing faster moves toward the downstream side of the separated portion. Since at least part of the inclined portion is located downstream of at least part of the separated portion, the reactant gas flowing faster flows along the inclined portion so as to easily flow toward the power generation portion. This increases the flow speed of the reactant gas in the vicinity of the power generation portion.

In the separator for the fuel cell, it is preferred that the separated portion be inclined so as to become farther from the power generation portion toward the downstream side.

In this structure, since the separated portion is inclined so as to become farther from the power generation portion toward the downstream side, the cross-sectional flow area of a portion of the gas passage where the separated portion is disposed gradually increases toward the downstream side. Such an increase in the cross-sectional flow area gradually occurs from the power generation portion.

Accordingly, the reactant gas flowing through the space between the first ribs easily flows toward the side on which the cross-sectional flow area increases, that is, toward the power generation portion when passing through the space between the separated portions. Thus, the flow speed of reactant gas in the vicinity of the power generation portion further increases thanks to the synergy of the flow of reactant gas toward the power generation portion, caused by the changes in the cross-sectional flow area, and the flow of reactant gas toward the power generation portion along the inclined portion.

In the separator for the fuel cell, it is preferred that the separated portion and the inclined portion overlap each other in the arrangement direction.

This structure allows some of the reactant gas flowing through the space between the separated portions to flow toward the power generation portion along the inclined portion before passing through the separated portion. Thus, the reactant gas easily flows toward the power generation portion. This further increases the flow speed of the reactant gas in the vicinity of the power generation portion.

In the separator for the fuel cell, it is preferred that a protruding end surface of a corresponding one of the first ribs and a top surface of each of the protrusions be coplanar.

In this structure, the protruding end surfaces of the first ribs are in contact with the power generation portion together with the top surfaces of the protrusions. Thus, as compared with when the first ribs are not in contact with the power generation portion, the rate of change in the cross-sectional flow area increases between the space of the gas passage between the first ribs and a portion immediately downstream of the space. As a result, the pressure difference in reactant gas increases between the space and the portion. Thus, reactant gas flows toward the power generation portion more easily. This further increases the flow speed of the reactant gas in the vicinity of the power generation portion.

In the separator for the fuel cell, it is preferred that an entirety of a protruding end surface of each of the ribs be located between a top surface of a corresponding one of the protrusions and a bottom of the gas passage in a protruding direction of the protrusions.

In this structure, the ribs are not in contact with the power generation portion. This prevents the power generation portion from being closed by the ribs. Accordingly, a decrease in the power generating performance of the fuel cell is limited.

A second aspect of a separator for a fuel cell that achieves the above-described objective is configured to contact a power generation portion of the fuel cell. The separator includes protrusions that extend in parallel and are spaced apart from each other. The protrusions are configured to contact the power generation portion. The separator includes a gas passage that extends between two adjacent ones of the protrusions along the protrusions. The gas passage is configured to allow reactant gas to flow through the gas passage. An upstream side and a downstream side in a flow direction of the reactant gas flowing through the gas passage are referred to as an upstream side and a downstream side, respectively. The protrusions include first protrusions and a second protrusion. The first protrusions are arranged in parallel and spaced apart from each other. The second protrusion is located between adjacent ones of the first protrusions in an arrangement direction of the first protrusions. A downstream end of each of the first protrusions includes a separated portion separated from the power generation portion. An upstream end of the second protrusion includes an inclined portion inclined so as to become closer to the power generation portion toward the downstream side. At least part of the inclined portion is located downstream of at least part of the separated portion.

In this structure, reactant gas flowing through the gas passage moves toward the downstream side of the separated portion. Since at least part of the inclined portion is located downstream of at least part of the separated portion, the reactant gas flows along the inclined portion so as to easily flow toward the power generation portion. This increases the flow speed of the reactant gas in the vicinity of the power generation portion.

In the separator for the fuel cell, it is preferred that the separated portion be inclined so as to become farther from the power generation portion toward the downstream side.

In this structure, since the separated portion is inclined so as to become farther from the power generation portion toward the downstream side, the cross-sectional flow area of a portion of the gas passage where the separated portion is disposed gradually increases toward the downstream side. Such an increase in the cross-sectional flow area gradually occurs from the power generation portion.

Accordingly, the reactant gas flowing through the gas passage easily flows toward the side on which the cross-sectional flow area increases, that is, toward the power generation portion when passing through the space between the separated portions. Thus, the flow speed of reactant gas in the vicinity of the power generation portion further increases thanks to the synergy of the flow of reactant gas toward the power generation portion, caused by the changes in the cross-sectional flow area, and the flow of reactant gas toward the power generation portion along the inclined portion.

In the separator for the fuel cell, it is preferred that the separated portion and the inclined portion overlap each other in the arrangement direction.

This structure allows some of the reactant gas flowing through the space between the separated portions to flow toward the power generation portion along the inclined portion before passing through the separated portion. Thus, the reactant gas easily flows toward the power generation portion. This further increases the flow speed of the reactant gas in the vicinity of the power generation portion.

Advantageous Effects of Invention

The present disclosure increases the flow speed of the reactant gas in the vicinity of the power generation portion.

DESCRIPTION OF EMBODIMENTS

First Embodiment

Figure 1:
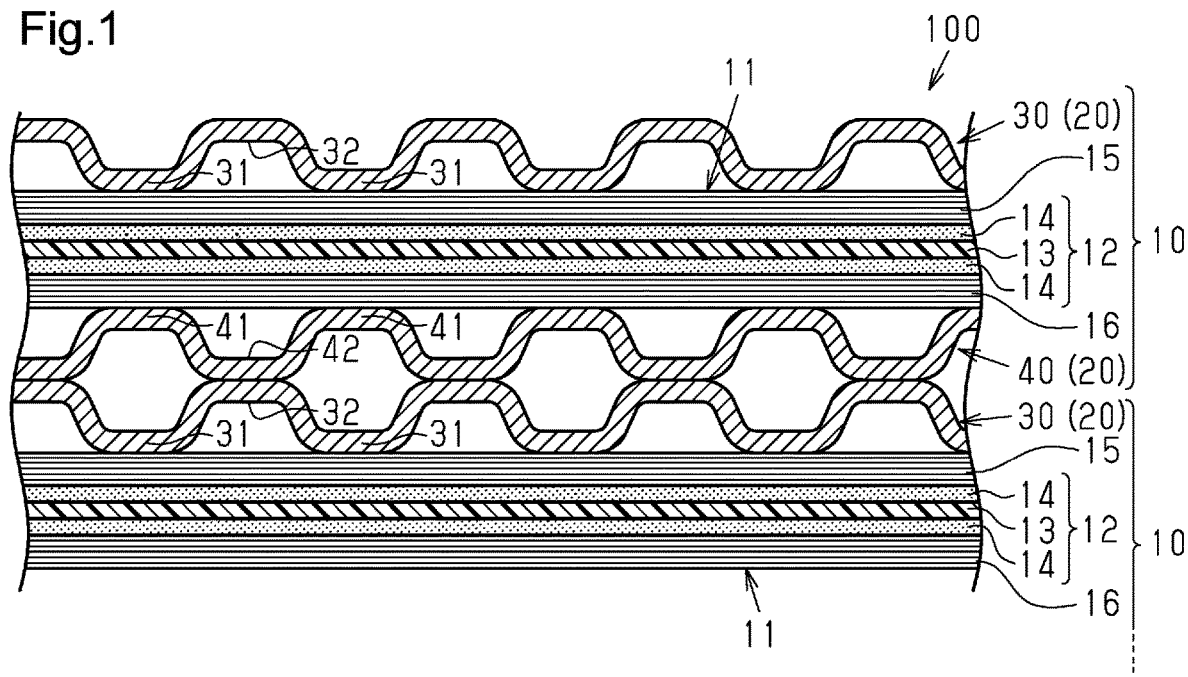
FIG. 1 is a cross-sectional view of a separator for a fuel cell according to a first embodiment, mainly showing cells each including the separator.

A separator for a fuel cell according to a first embodiment will now be described with reference to FIGS. 1 to 4.

For illustrative purposes, some parts of the structures in the drawings may be exaggerated or simplified. Further, the dimensional ratios of the components may be different from actual ones.

As shown in FIG. 1, a separator for a fuel cell of the present embodiment (hereinafter referred to as the separator 20) is used for a stack 100 of a polymer electrolyte fuel cell. The separator 20 is a collective term for a first separator 30 and a second separator 40, which will be described later.

The stack 100 includes a structure in which cells 10 are stacked. Each cell 10 includes the first separator 30 on an anode side, the second separator 40 on a cathode side, and a power generation portion 11 held between the first separator 30 and the second separator 40.

The power generation portion 11 includes a membrane electrode assembly 12, an anode-side gas diffusion layer 15, and a cathode-side gas diffusion layer 16. The membrane electrode assembly 12 is held between the anode-side gas diffusion layer 15 and the cathode-side gas diffusion layer 16. The anode-side gas diffusion layer 15 is located between the membrane electrode assembly 12 and the first separator 30. The cathode-side gas diffusion layer 16 is located between the membrane electrode assembly 12 and the second separator 40. The anode-side gas diffusion layer 15 and the cathode-side gas diffusion layer 16 are made of carbon fibers.

The membrane electrode assembly 12 includes an electrolyte membrane 13 and two catalytic electrode layers 14. The electrolyte membrane 13 is made of a solid polymer material that has an excellent proton conductivity in a wet state. The electrolyte membrane 13 is held between the catalytic electrode layers 14. Each catalytic electrode layer 14 supports a catalyst (e.g., platinum) in order to expedite the electrochemical reaction of reactant gas in the fuel cell.

The first separator 30 is formed by, for example, pressing a composite material that includes a carbon material (e.g., graphite) and a resin material (e.g., polypropylene) serving as binder while heating the composite material. The first separator 30 includes protrusions 31 and gas passages 32. The protrusions 31 extend in parallel and are spaced apart from each other. The protrusions 31 are configured to contact the power generation portion 11. Each gas passage 32 is arranged between two adjacent ones of the protrusions 31. The gas passage 32 is configured to allow reactant gas to flow through the gas passage 32. Each protrusion 31 is in contact with the anode-side gas diffusion layer 15. The protrusions 31 and the gas passages 32 extend in the direction that is orthogonal to the sheet of FIG. 1.

The second separator 40 is formed by, for example, pressing a composite material that includes a carbon material (e.g., graphite) and a resin material (e.g., polypropylene) while heating the composite material. The second separator 40 includes protrusions 41 and gas passages 42. The protrusions 41 extend in parallel and are spaced apart from each other. The protrusions 41 are configured to contact the power generation portion 11. Each gas passage 42 is arranged between two adjacent ones of the protrusions 41. The gas passage 42 is configured to allow reactant gas to flow through the gas passage 42. Each protrusion 41 is in contact with the cathode-side gas diffusion layer 16. The protrusions 41 and the gas passages 42 extend in the direction that is orthogonal to the sheet of FIG. 1.

The section of the first separator 30 defined by each gas passage 32 and the anode-side gas diffusion layer 15 includes a fuel gas passage through which fuel gas (reactant gas) flows. The section of the second separator 40 defined by each gas passage 42 and the cathode-side gas diffusion layer 16 includes an oxidizing gas passage through which oxidizing gas (reactant gas) flows. In the present embodiment, the fuel gas passing through the fuel gas passage is hydrogen, and the oxidizing gas flowing through the oxidizing gas passage is air.

The rear surface of the bottom of each gas passage 32 of the first separator 30 and the rear surface of the bottom of the gas passage 42 of the second separator 40 adjacent to the first separator 30 are joined to each other through, for example, laser welding. The section defined by the rear surface of the protrusion 31 of the first separator 30 and the rear surface of the protrusion 41 of the second separator 40 includes a coolant passage through which coolant flows.

Figure 2:
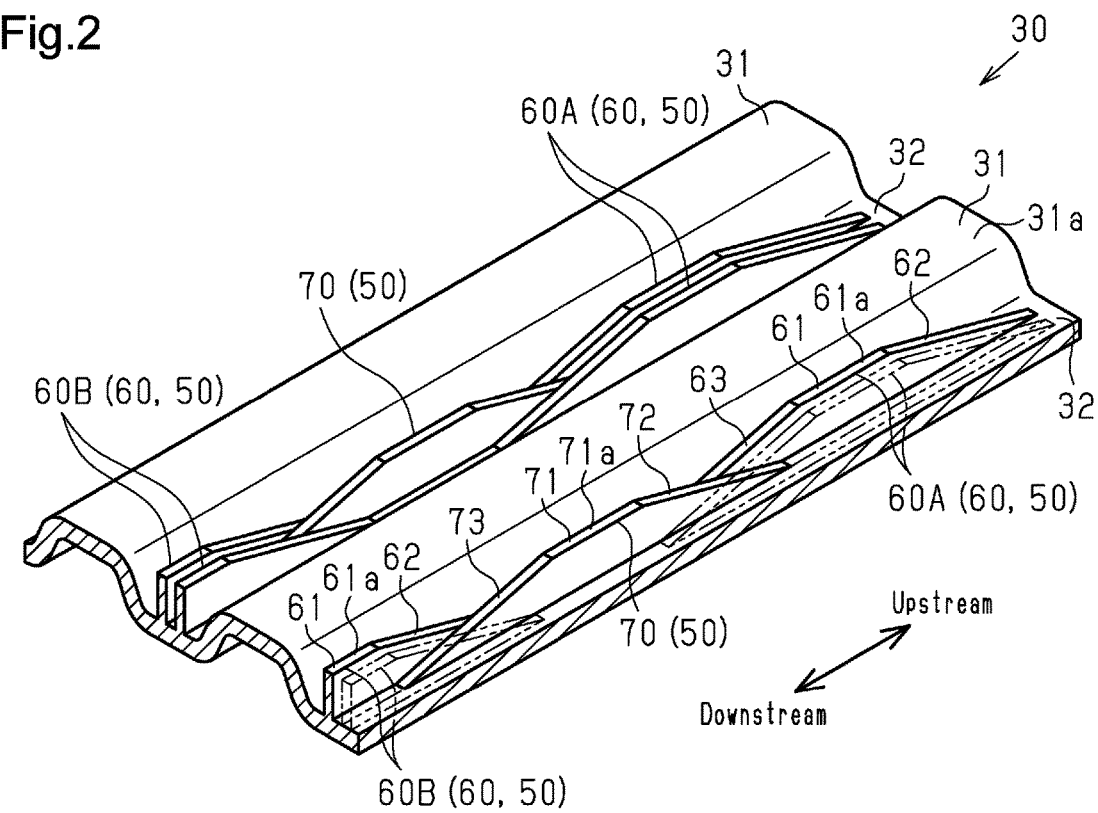
FIG. 2 is a perspective view showing the separator for the fuel cell according to the first embodiment.

As shown in FIG. 2, in the present embodiment, each gas passage 32 of the first separator 30 includes ribs 50. The ribs 50 protrude from the bottom of the gas passage 32 toward the power generation portion 11 and extend in an extending direction of the gas passage 32. Although not shown in the drawings, each gas passage 42 of the second separator 40 includes ribs 50 that protrude from the bottom of the gas passage 42 toward the power generation portion 11 and extend in an extending direction of the gas passage 42. Since the first separator 30 and the second separator 40 have the same structure in the present embodiment, the ribs 50 of the first separator 30 will be hereinafter described and the ribs 50 of the second separator 40 will not be described.

The arrangement direction of the protrusions 31 is hereinafter simply referred to as the arrangement direction. The extending direction of the gas passages 32 is hereinafter simply referred to as the extending direction. In the present embodiment, the arrangement direction is orthogonal to the extending direction. The upstream side in the flow direction of reactant gas flowing through the gas passages 32 is simply referred to as the upstream side. The downstream side in the flow direction is simply referred to as the downstream side.

Figure 3:
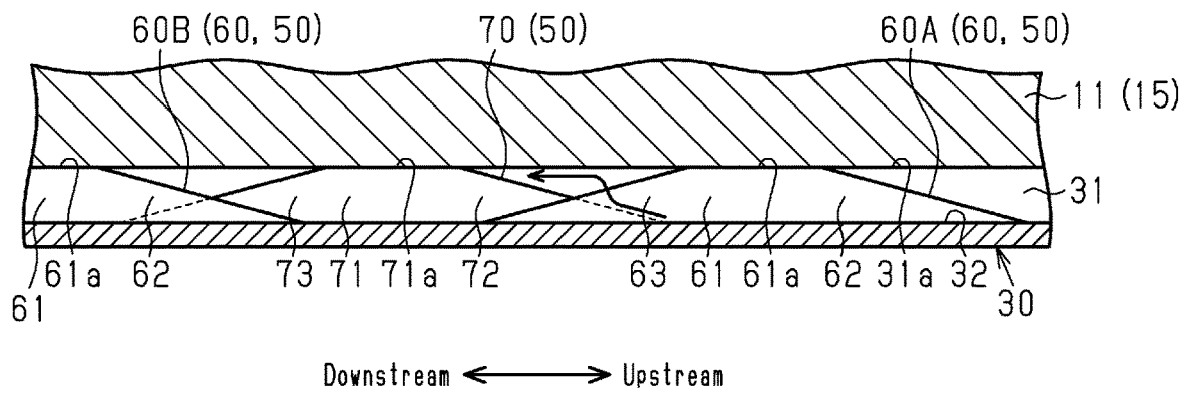
FIG. 3 is a cross-sectional view showing the separator for the fuel cell according to the first embodiment.

As shown in FIGS. 2 and 3, each set of the ribs 50 includes a pair of first ribs 60 and a second rib 70. The first ribs 60 are arranged in parallel and spaced apart from each other in the arrangement direction. The second rib 70 is located between adjacent ones of the first ribs 60 in the arrangement direction. The ribs 60, 70 are plate-shaped. In FIG. 2, some of the first ribs 60 are shown by the broken lines to indicate the positional relationship between the first ribs 60 and the second ribs 70.

Each first rib 60 includes an extension 61 that extends in contact with the power generation portion 11, an upstream inclined portion 62 that is continuous with the upstream end of the extension 61, and a downstream inclined portion 63 that is continuous with the downstream end of the extension 61. The upstream inclined portion 62 is located at the upstream end of the first rib 60. The downstream inclined portion 63 is located at the downstream end of the first rib 60. The downstream inclined portion 63 of the first rib 60 is an example of a separated portion.

As shown in FIG. 3, a protruding end surface 61a of each extension 61 and a top surface 31a of the corresponding protrusion 31 are coplanar. That is, the entire extension 61 is in contact with the power generation portion 11 in the extending direction. More specifically, the entire extension 61 of the first rib 60 of the first separator 30 is in contact with the anode-side gas diffusion layer 15 in the extending direction. Although not shown in the drawings, the entire extension 61 of the first rib 60 of the second separator 40 is in contact with the cathode-side gas diffusion layer 16 in the extending direction.

The upstream inclined portion 62 is inclined so as to become closer to the power generation portion 11 toward the downstream side. In other words, the upstream inclined portion 62 is inclined such that the protrusion amount from the bottom of the gas passage 32 decreases toward the upstream side. The upstream inclined portion 62 of the present embodiment is triangular as viewed in the arrangement direction.

The inclination angle of the upstream inclined portion 62 relative to the bottom of the gas passage 32 is preferably, for example, between 15° and 45°. The inclination angle of the upstream inclined portion 62 in the present embodiment is 15°.

The downstream inclined portion 63 is inclined so as to become farther from the power generation portion 11 toward the downstream side. In other words, the downstream inclined portion 63 is inclined such that the protrusion amount from the bottom of the gas passage 32 decreases toward the downstream side. The downstream inclined portion 63 of the present embodiment is triangular as viewed in the arrangement direction.

The inclination angle of the downstream inclined portion 63 relative to the bottom of the gas passage 32 is preferably, for example, between 15° and 45°. The inclination angle of the downstream inclined portion 63 in the present embodiment is 15°.

Figure 4:
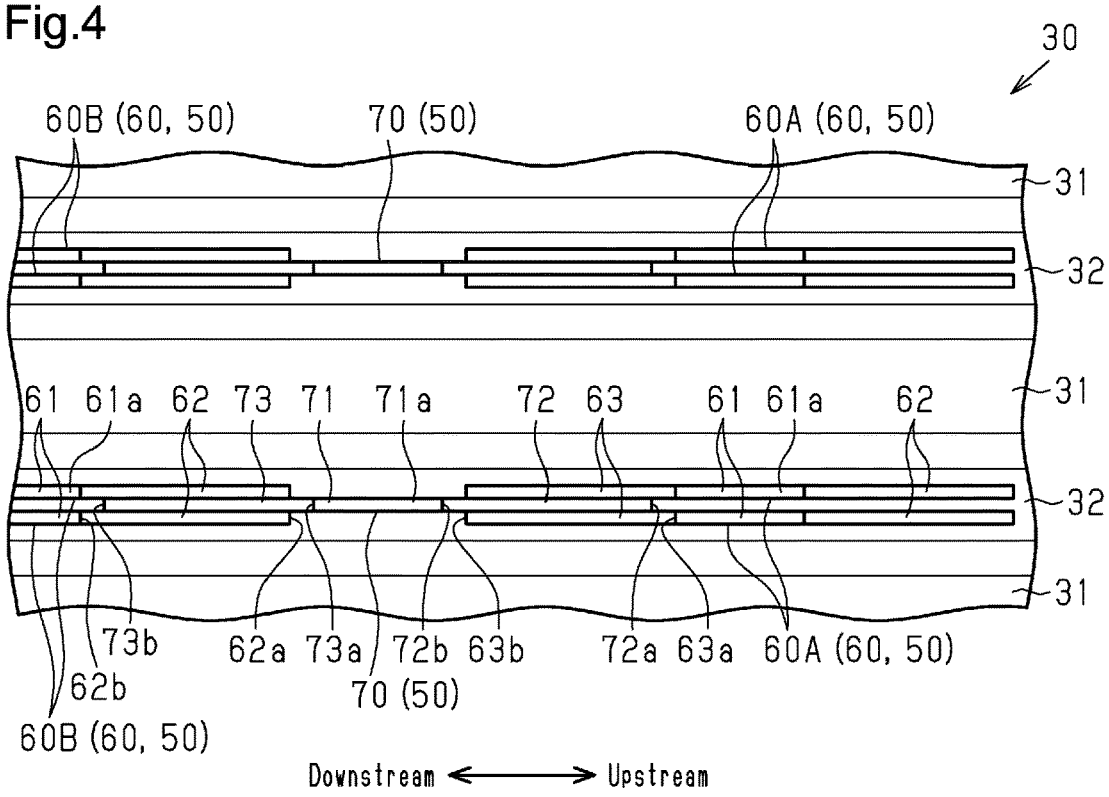
FIG. 4 is a plan view showing the separator for the fuel cell according to the first embodiment.

As shown in FIG. 4, each first rib 60 is located at a position separated from its adjacent protrusions 31 in the arrangement direction. That is, a gap is formed between each first rib 60 and the corresponding protrusion 31 adjacent to the first rib 60.

In each gas passage 32 of the present embodiment, pairs of first ribs 60 are spaced apart from each other in the extending direction. FIGS. 2 to 4 show two pairs of first ribs 60 that are spaced apart from each other in the extending direction. To facilitate understanding, a pair of first ribs 60 on the upstream side may be hereinafter referred to as the first ribs 60A and a pair of first ribs 60 on the downstream side may be hereinafter referred to as the first ribs 60B in FIGS. 2 to 4.

Each two first ribs 60 are located at the same position in the extending direction. The first ribs 60 have the same shape. Thus, each pair of first ribs 60 includes the upstream inclined portions 62 at the same position in the extending direction and the downstream inclined portions 63 at the same position in the extending direction.

The second rib 70 of the present embodiment has the same shape as the first rib 60. The components of the second rib 70 are given reference numbers 7*, which are obtained by adding 10 to reference numbers 6* of the first rib 60, and will not be described. The upstream inclined portion 72 of the second rib 70 is an example of an inclined portion.

As shown in FIGS. 3 and 4, at least part of the upstream inclined portion 72 of each second rib 70 is located downstream of at least part of the downstream inclined portion 63 of the corresponding first rib 60. In the present embodiment, the downstream inclined portions 63 of the first ribs 60A and the upstream inclined portion 72 of the second rib 70 overlap each other in the arrangement direction. That is, the downstream inclined portions 63 of the first ribs 60A and the upstream inclined portion 72 of the second rib 70 are in contact with each other in the arrangement direction.

Likewise, the upstream inclined portion 62 of each first rib 60B and the downstream inclined portion 73 of the corresponding second rib 70 overlap each other in the arrangement direction. That is, the upstream inclined portions 62 of the first ribs 60B and the downstream inclined portion 73 of the second rib 70 are in contact with each other in the arrangement direction.

As shown in FIG. 4, an upstream edge 72a of the upstream inclined portion 72 of each second rib 70 is located downstream of an upstream edge 63a of the downstream inclined portion 63 of the corresponding first rib 60A. Further, a downstream edge 72b of the upstream inclined portion 72 of each second rib 70 is located downstream of a downstream edge 63b of the downstream inclined portion 63 of the corresponding first rib 60A.

Likewise, a downstream edge 73b of the downstream inclined portion 73 of each second rib 70 is located upstream of a downstream edge 62b of the upstream inclined portion 62 of the corresponding first rib 60B. Further, an upstream edge 73a of the downstream inclined portion 73 of each second rib 70 is located upstream of an upstream edge 62a of the upstream inclined portion 62 of the corresponding first rib 60B.

The edges of each of the inclined portions 62, 63, 72, 73 in the present embodiment define the boundaries between the inclined portions 62, 63, 72, 73 and the bottoms of the gas passage 32 continuous with the inclined portions 62, 63, 72, 73 or the extensions 61, 71.

The operation of the present embodiment will now be described.

Reactant gas flows faster when flowing through the space between the first ribs 60 in each gas passage 32. The reactant gas flowing faster moves toward the downstream side of the downstream inclined portion 63 of each first rib 60. Since at least part of the upstream inclined portion 72 of the second rib 70 is located downstream of at least part of the downstream inclined portion 63, the reactant gas flowing faster flows along the upstream inclined portion 72 so as to easily flow toward the power generation portion 11.

Further, since the downstream inclined portion 63 is inclined so as to become farther from the power generation portion 11 toward the downstream side, the cross-sectional flow area of a portion of the gas passage 32 where the downstream inclined portion 63 is disposed gradually increases toward the downstream side. Such an increase in the cross-sectional flow area gradually occurs from the power generation portion 11.

Accordingly, the reactant gas flowing through the space between the first ribs 60 easily flows toward the side on which the cross-sectional flow area increases (i.e., toward the power generation portion 11) when passing through the space between the downstream inclined portions 63.

As shown by the arrow in FIG. 3, the flow of the reactant gas toward the power generation portion 11 flows in an orientation that is generally orthogonal to the oblique side of the downstream inclined portion 63. Thus, the reactant gas reaches the power generation portion 11 on the upstream side more easily when the inclination angle of the downstream inclined portion 63 is 150 than when, for example, the inclination angle of the downstream inclined portion 63 is 45°.

The advantages of the present embodiment will now be described.

(1) The gas passages 32 each include the ribs 50. The ribs 50 protrude toward the power generation portion 11 and extend in the extending direction of the gas passages 32. The ribs 50 include the first ribs 60 and the second ribs 70. The first ribs 60 are arranged in parallel and spaced apart from each other in the arrangement direction of the protrusions 31. Each second rib 70 is located between adjacent ones of the first ribs 60 in the arrangement direction. The downstream end of each first rib 60 includes the downstream inclined portion 63. The downstream inclined portion 63 is inclined so as to become farther from the power generation portion 11 toward the downstream side. The upstream end of the second rib 70 includes the upstream inclined portion 72. The upstream inclined portion 72 is inclined so as to become closer to the power generation portion 11 toward the downstream side. At least part of the upstream inclined portion 72 is located downstream of at least part of the downstream inclined portion 63.

This structure provides the above-described operation. Thus, the flow speed of reactant gas in the vicinity of the power generation portion 11 increases thanks to the synergy of the flow of reactant gas toward the power generation portion 11, caused by the changes in the cross-sectional flow area, and the flow of reactant gas toward the power generation portion 11 along the upstream inclined portion 72 of the second rib 70.

(2) The downstream inclined portion 63 of each first rib 60A and the upstream inclined portion 72 of the corresponding second rib 70 overlap each other in the arrangement direction.

This structure allows some of the reactant gas flowing through the space between the downstream inclined portions 63 of the first ribs 60A to flow toward the power generation portion 11 along the upstream inclined portion 72 of the second rib 70 before passing through the downstream inclined portions 63. Thus, the reactant gas easily flows toward the power generation portion 11. This further increases the flow speed of the reactant gas in the vicinity of the power generation portion 11.

(3) The protruding end surfaces 61a of the first ribs 60 and the top surfaces 31a of the protrusions 31 are coplanar.

In this structure, the protruding end surfaces 61a of the first ribs 60 are in contact with the power generation portion 11 together with the top surfaces 31a of the protrusions 31. Thus, as compared with when the first ribs 60 are not in contact with the power generation portion 11, the rate of change in the cross-sectional flow area increases between the space of the gas passage 32 between the first ribs 60 and a portion immediately downstream of the space. As a result, the pressure difference in reactant gas increases between the space and the portion. Thus, reactant gas flows toward the power generation portion 11 more easily. This further increases the flow speed of the reactant gas in the vicinity of the power generation portion 11.

(4) The upstream inclined portion 62 of each first rib 60B and the downstream inclined portion 73 of the corresponding second rib 70 overlap each other in the arrangement direction.

This structure allows some of the reactant gas flowing through the space between the second rib 70 and the protrusions 31 adjacent to that second rib 70 to flow toward the power generation portion 11 along the upstream inclined portions 62 of the first ribs 60 before passing through the downstream inclined portion 73 of the second rib 70. Thus, the reactant gas easily flows toward the power generation portion 11. This increases the flow speed of the reactant gas in the vicinity of the power generation portion 11 in a broader range.

(5) The downstream inclined portions 63 of each pair of first ribs 60 are located at the same position in the extending direction.

In this structure, the downstream inclined portions 63 allow the reactant gas passing through the space between two adjacent ones of the first ribs 60 to easily flow toward the power generation portion 11 and easily flow toward the opposite sides in the arrangement direction. This increases the flow speed of the reactant gas in the vicinity of the power generation portion 11 in a broader range.

Second Embodiment

The separator for the fuel cell according to a second embodiment will now be described with reference to FIGS. 5 to 7, focusing on the differences from the first embodiment.

In the second embodiment, like or the same reference numbers are given to those components that are like or the same as the corresponding components of the first embodiment. Further, the components that correspond to those in the first embodiment are given reference numbers 1, which are obtained by adding 100 to reference numbers  of the first embodiment, and will not be described.

In the present embodiment, an anode-side separator 120 and a cathode-side second separator 120 have the same structure. Thus, the anode-side separator 120 (i.e., first separator 130) will be hereinafter described and the cathode-side separator 120 will not be described.

Figure 5:
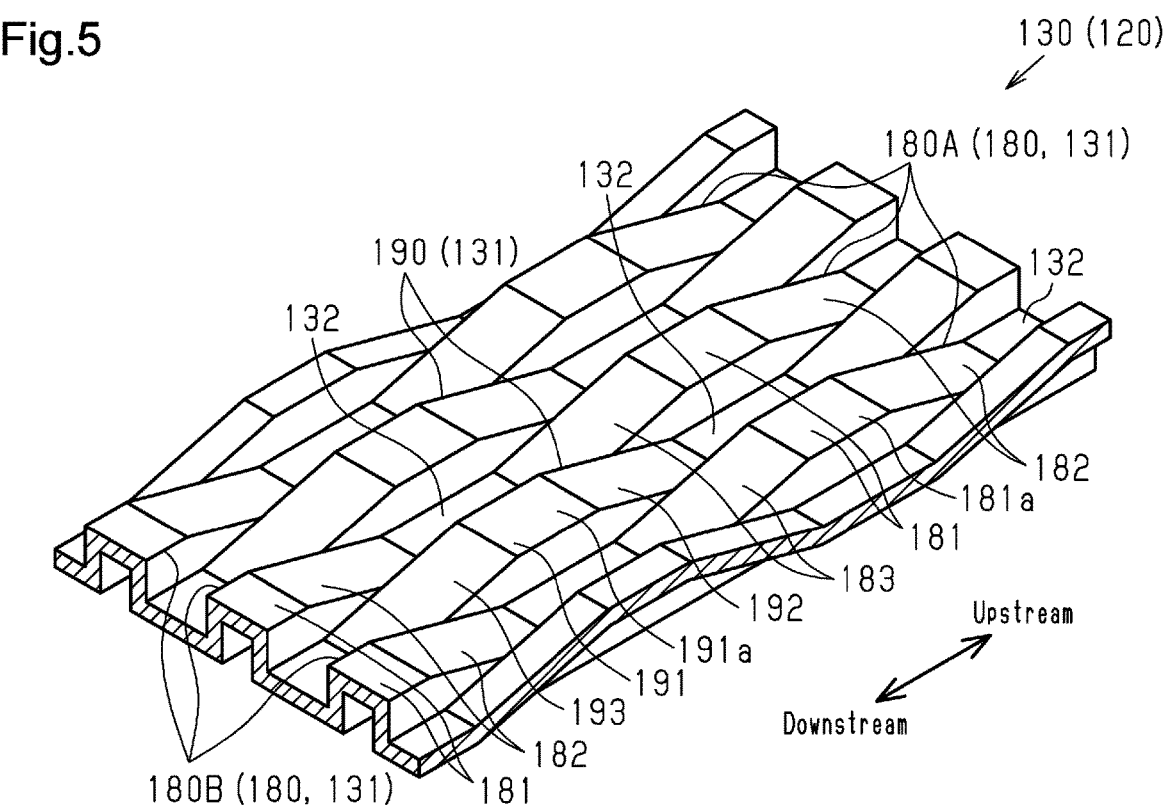
FIG. 5 is a perspective view showing the separator for the fuel cell according to a second embodiment.
Figure 6:
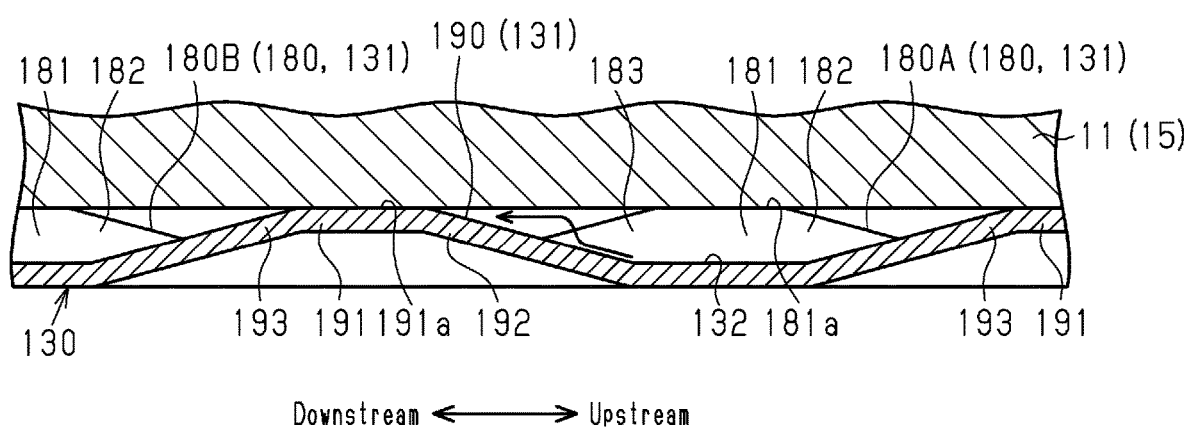
FIG. 6 is a cross-sectional view showing the separator for the fuel cell of the second embodiment.

As shown in FIGS. 5 and 6, the first separator 130 includes protrusions 131 and gas passages 132. The protrusions 131 extend in parallel and are spaced apart from each other. The protrusions 131 are configured to contact the power generation portion 11. Each gas passage 132 is arranged between two adjacent ones of the protrusions 131. The gas passage 132 is configured to allow reactant gas to flow through the gas passage 132.

The protrusions 131 protrude from the bottom of the gas passage 132 toward one side in a thickness direction of the first separator 130, that is, toward the power generation portion 11. At the portion of the first separator 130 where the protrusions 131 and the gas passage 132 are arranged, that is, at the portion of the first separator 130 facing the power generation portion 11, the surface on one side in the thickness direction does not connect to the surface on the other side.

The arrangement direction of the protrusions 131 is hereinafter simply referred to as the arrangement direction. The extending direction of the gas passages 132 is hereinafter simply referred to as the extending direction. In the present embodiment, the arrangement direction is orthogonal to the extending direction. The upstream side in the flow direction of reactant gas flowing through the gas passages 132 is simply referred to as the upstream side. The downstream side in the flow direction is simply referred to as the downstream side.

The protrusions 131 include first protrusions 180 and second protrusions 190. The first protrusions 180 are arranged in parallel and spaced apart from each other in the arrangement direction. Each second protrusion 190 is located between adjacent ones of the first protrusions 180 in the arrangement direction.

Each first protrusion 180 includes an extension 181 that extends in contact with the power generation portion 11, an upstream inclined portion 182 that is continuous with the upstream end of the extension 181, and a downstream inclined portion 183 that is continuous with the downstream end of the extension 181. The upstream inclined portion 182 is located at the upstream end of the first protrusion 180. The downstream inclined portion 183 is located at the downstream end of the first protrusion 180. The downstream inclined portion 183 of the first protrusion 180 is an example of the separated portion.

As shown in FIG. 6, the entirety of a protruding end surface 181a of the extension 181 is in contact with the power generation portion 11 in the extending direction. More specifically, the entire extension 181 of the first protrusion 180 of the first separator 130 is in contact with the anode-side gas diffusion layer 15 in the extending direction.

The upstream inclined portion 182 is inclined so as to become closer to the power generation portion 11 toward the downstream side. In other words, the upstream inclined portion 182 is inclined such that the protrusion amount from the bottom of the gas passage 132 decreases toward the upstream side. The upstream inclined portion 182 of the present embodiment is triangular as viewed in the arrangement direction.

The inclination angle of the upstream inclined portion 182 relative to the bottom of the gas passage 132 is preferably, for example, between 15° and 45°. The inclination angle of the upstream inclined portion 182 in the present embodiment is 15°.

The downstream inclined portion 183 is inclined so as to become farther from the power generation portion 11 toward the downstream side. In other words, the downstream inclined portion 183 is inclined such that the protrusion amount from the bottom of the gas passage 132 decreases toward the downstream side. The downstream inclined portion 183 of the present embodiment is triangular as viewed in the arrangement direction.

The inclination angle of the downstream inclined portion 183 relative to the bottom of the gas passage 132 is preferably, for example, between 15° and 45°. The inclination angle of the downstream inclined portion 183 in the present embodiment is 15°.

In the present embodiment, the first protrusions 180 are spaced apart from each other in the arrangement direction and spaced apart from each other in the extending direction. Likewise, the second protrusions 190 are spaced apart from each other in the arrangement direction and spaced apart from each other in the extending direction. To facilitate understanding, the first protrusions 180 on the upstream side may be hereinafter referred to as the first protrusions 180A and the first protrusions 180 on the downstream side may be hereinafter referred to as the first protrusions 180B in FIGS. 5 to 7.

The second protrusions 190 have the same shape as the first protrusions 180. The components of the second protrusion 190 are given reference numbers 19*, which are obtained by adding 10 to reference numbers 18* of the first protrusions 180, and will not be described. The upstream inclined portion 192 of the second protrusion 190 is an example of the inclined portion.

Figure 7:
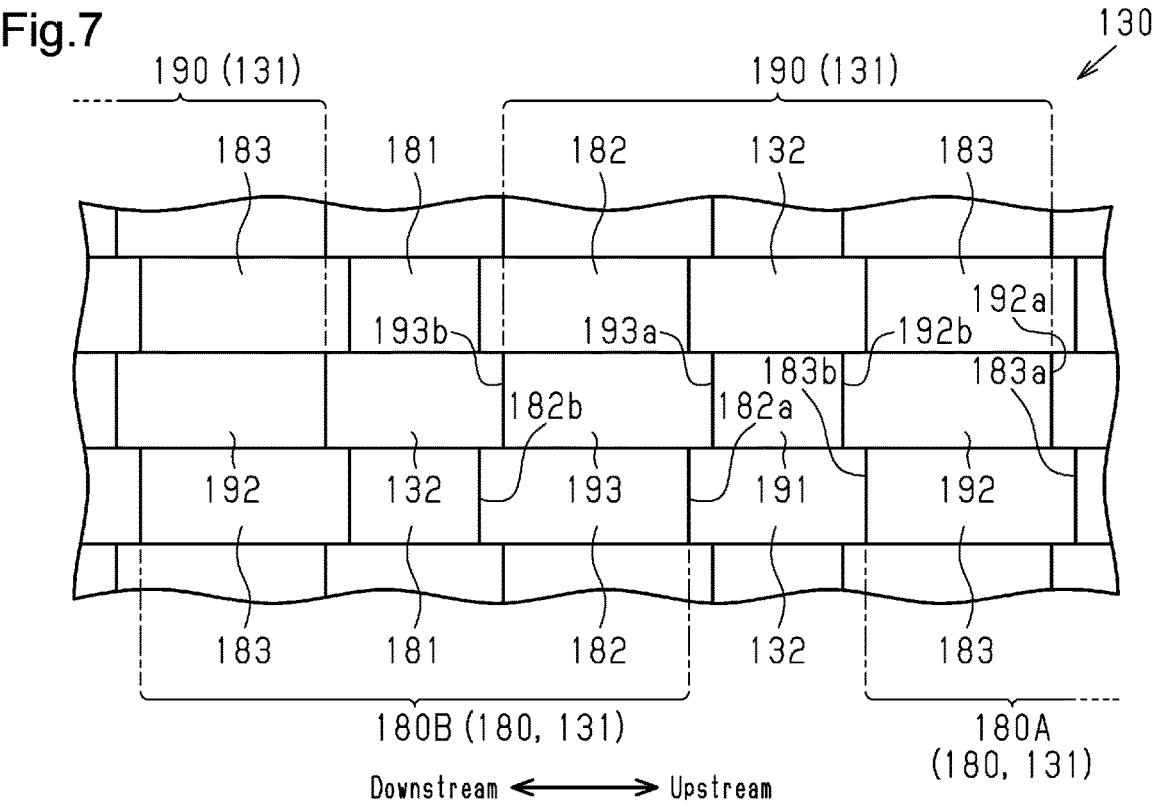
FIG. 7 is a plan view showing the separator for the fuel cell according to the second embodiment.

As shown in FIGS. 6 and 7, at least part of the upstream inclined portion 192 of each second protrusion 190 is located downstream of at least part of the downstream inclined portion 183 of the corresponding first protrusion 180A. More specifically, the downstream inclined portion 183 of the first protrusion 180A and the upstream inclined portion 192 of the second protrusion 190 overlap each other in the arrangement direction. That is, the downstream inclined portion 183 of the first protrusion 180A and the upstream inclined portion 192 of the second protrusion 190 are in contact with each other in the arrangement direction.

Likewise, the upstream inclined portion 182 of the first protrusion 180B and the downstream inclined portion 193 of the second protrusion 190 overlap each other in the arrangement direction. That is, the upstream inclined portion 182 of the first protrusion 180B and the downstream inclined portion 193 of the second protrusion 190 are in contact with each other in the arrangement direction.

As shown in FIG. 7, an upstream edge 192a of the upstream inclined portion 192 of each second protrusion 190 is located downstream of an upstream edge 183a of the downstream inclined portion 183 of the corresponding first protrusion 180A. Further, a downstream edge 192b of the upstream inclined portion 192 of the second protrusion 190 is located downstream of a downstream edge 183b of the downstream inclined portion 183 of the first protrusion 180A.

Likewise, a downstream edge 193b of the downstream inclined portion 193 of each second protrusion 190 is located upstream of a downstream edge 182b of the upstream inclined portion 182 of the corresponding first protrusion 180B. Further, an upstream edge 193a of the downstream inclined portion 193 of the second protrusion 190 is located upstream of an upstream edge 182a of the upstream inclined portion 182 of the first protrusion 180B.

The operation of the present embodiment will now be described.

Reactant gas flowing through the gas passage 132 moves toward the downstream side of the downstream inclined portion 183 of the first protrusion 180. Since at least part of the upstream inclined portion 192 of the second protrusion 190 is located downstream of at least part of the downstream inclined portion 183, the reactant gas flows along the upstream inclined portion 192 so as to easily flow toward the power generation portion 11. This increases the flow speed of the reactant gas in the vicinity of the power generation portion 11.

Further, since the downstream inclined portion 183 is inclined so as to become farther from the power generation portion 11 toward the downstream side, the cross-sectional flow area of a portion of the gas passage 132 where the downstream inclined portion 183 is disposed gradually increases toward the downstream side. Such an increase in the cross-sectional flow area gradually occurs from the power generation portion 11.

Accordingly, the reactant gas flowing through the gas passage 132 easily flows toward the side on which the cross-sectional flow area increases, that is, toward the power generation portion 11 when passing through the space between the downstream inclined portions 183.

As shown by the arrow in FIG. 6, the flow of the reactant gas toward the power generation portion 11 flows in an orientation that is generally orthogonal to the oblique side of the downstream inclined portion 183. Thus, the reactant gas reaches the power generation portion 11 on the upstream side more easily when the inclination angle of the downstream inclined portion 183 is 150 than when, for example, the inclination angle of the downstream inclined portion 183 is 45°.

The advantages of the present embodiment will now be described.

(6) The first separator 130 includes the protrusions 131 and the gas passages 132. The protrusions 131 extend in parallel and are spaced apart from each other. The protrusions 131 are configured to contact the power generation portion 11. Each gas passage 132 is arranged between two adjacent ones of the protrusions 131. The gas passage 132 is configured to allow reactant gas to flow through the gas passage 132. The protrusions 131 include the first protrusions 180 and the second protrusions 190. The first protrusions 180 are arranged in parallel and spaced apart from each other. Each second protrusion 190 is located between adjacent ones of the first protrusions 180 in the arrangement direction. The downstream end of each first protrusion 180 includes the downstream inclined portion 183.

The downstream inclined portion 183 is inclined so as to become farther from the power generation portion 11 toward the downstream side. The upstream end of the second protrusion 190 includes the upstream inclined portion 192. The upstream inclined portion 192 is inclined so as to become closer to the power generation portion 11 toward the downstream side. At least part of the upstream inclined portion 192 is located downstream of at least part of the downstream inclined portion 183.

This structure provides the above-described operation. Thus, the flow speed of reactant gas in the vicinity of the power generation portion 11 increases thanks to the synergy of the flow of reactant gas toward the power generation portion 11, caused by the changes in the cross-sectional flow area of the gas passage 132, and the flow of reactant gas toward the power generation portion 11 along the upstream inclined portion 192.

(7) The downstream inclined portion 183 of each first protrusion 180A and the upstream inclined portion 192 of the corresponding second protrusion 190 overlap each other in the arrangement direction.

This structure allows some of the reactant gas flowing through the space between the downstream inclined portions 183 to flow toward the power generation portion 11 along the upstream inclined portion 192 before passing through the downstream inclined portions 183. Thus, the reactant gas easily flows toward the power generation portion 11. This further increases the flow speed of the reactant gas in the vicinity of the power generation portion 11.

Modifications

The present embodiments may be modified as follows. The present embodiments and the following modifications can be combined as long as they remain technically consistent with each other.

In the following first to fifth modifications respectively shown in FIGS. 8 to 12, the same components as those in the above-described embodiment are given the same reference numbers. Also, the components that correspond to those in the above-described embodiments are given reference numbers obtained by adding 200, 300, 400, 500, and 600 to the reference numbers of the components of the above-described embodiments, and will not be described.

Figure 8:
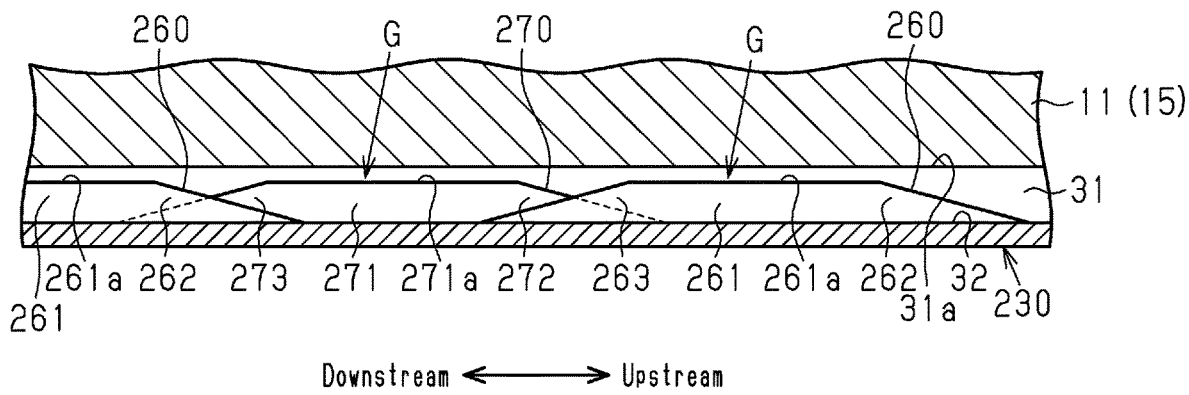
FIG. 8 is a cross-sectional view showing the separator for the fuel cell according to a first modification.

As shown in FIG. 8, the entirety of a protruding end surface 261a of an extension 261 of a first rib 260 and the entirety of a protruding end surface 271a of an extension 271 of a second rib 270 may be located between the top surface 31a of each protrusion 31 and the bottom of the gas passage 32 in the protruding direction (upward direction in FIG. 8) of the protrusion 31. That is, a gap G may be formed between the first rib 260 and the power generation portion 11 and between the second rib 270 and the power generation portion 11 over the entire gas passage 32 in the extending direction. In such a structure, the first rib 260 and the second rib 270 are not in contact with the power generation portion 11. This prevents the power generation portion 11 from being closed by the first rib 260 and the second rib 270. Accordingly, a decrease in the power generating performance of the fuel cell is limited. One of the entire protruding end surface 261a of the extension 261 and the entire protruding end surface 271a of the extension 271 may be located between the top surface 31a of each protrusion 31 and the bottom of the gas passage 32 in the protruding direction of the protrusion 31.

Only part of the extension 61 of the first rib 60 in the extending direction may be in contact with the power generation portion 11. Only part of the extension 71 of the second rib 70 in the extending direction may be in contact with the power generation portion 11.

Figure 9:
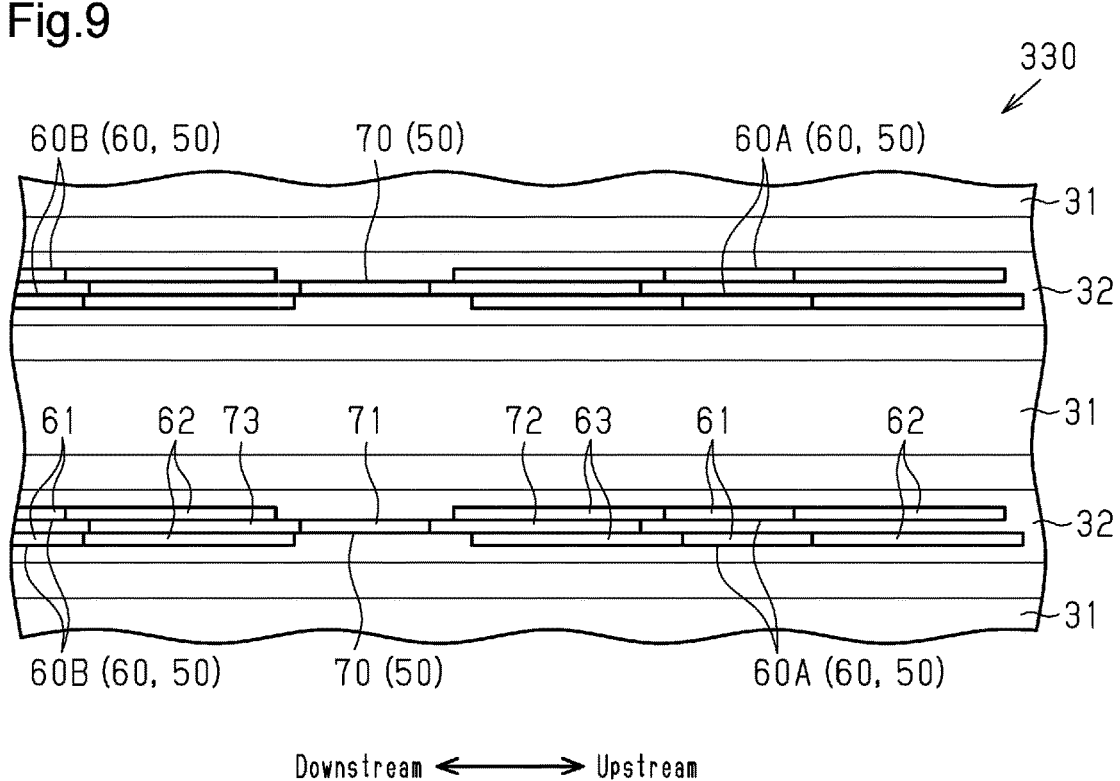
FIG. 9 is a plan view showing the separator for the fuel cell according to a second modification.

As shown in FIG. 9, each of the first ribs 60 in a pair of the first ribs 60 may be located at a different position in the extending direction.

Figure 10:
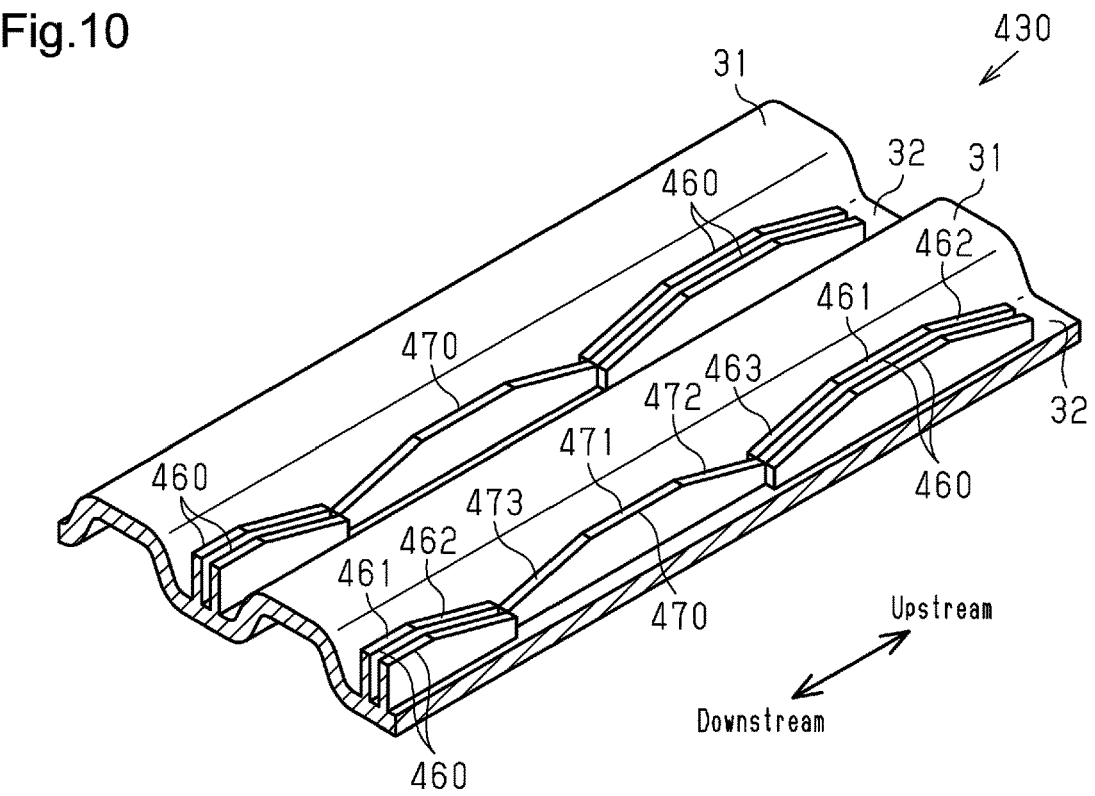
FIG. 10 is a perspective view showing the separator for the fuel cell according to a third modification.

As shown in FIG. 10, an upstream inclined portion 462 and a downstream inclined portion 463 of a first rib 460 may each include a tip surface that is orthogonal to the extending direction. Further, an upstream inclined portion 472 and a downstream inclined portion 473 of a second rib 470 may each include a tip surface that is orthogonal to the extending direction. The inclined portions 462, 463, 472, 473 are trapezoidal as viewed in the arrangement direction. In this modification, the tip surface of the downstream inclined portion 463 of the first rib 460 and the tip surface of the upstream inclined portion 472 of the second rib 70 are coplanar. Even this structure provides the above-described advantage (1).

Figure 11:
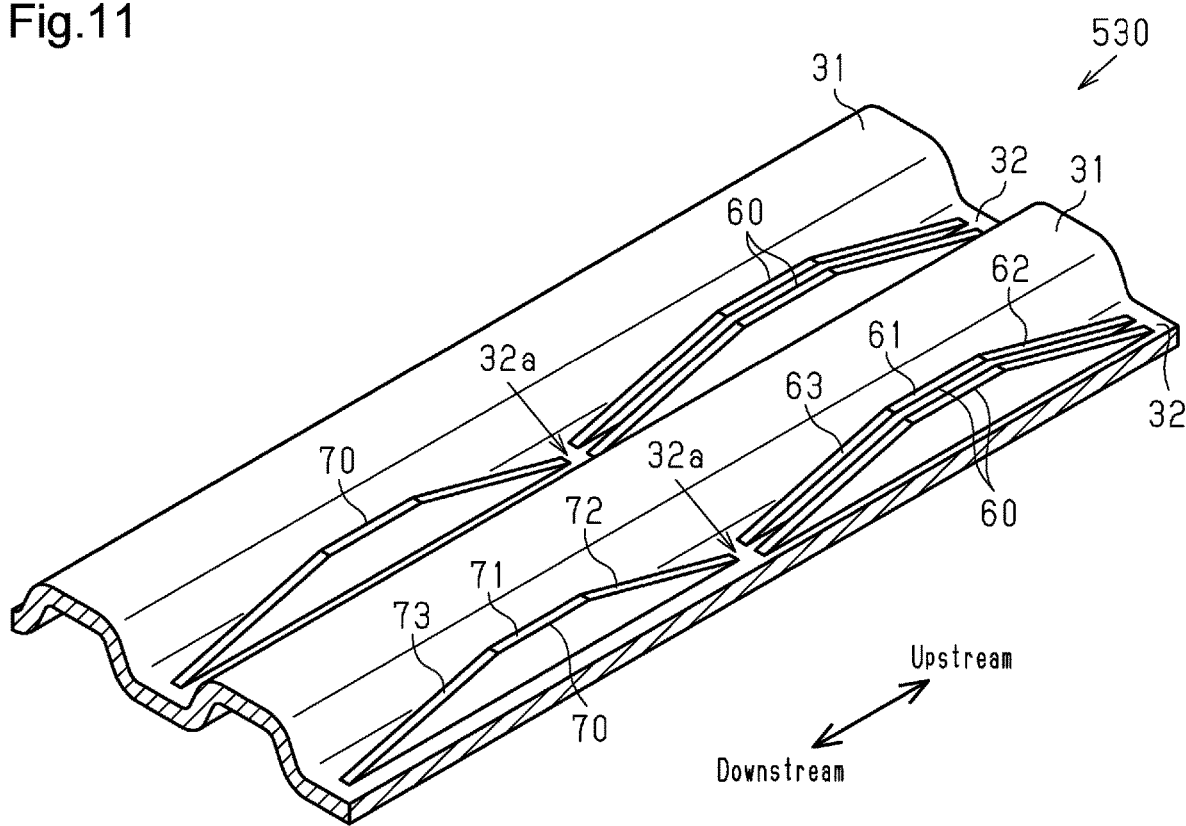
FIG. 11 is a perspective view showing the separator for the fuel cell according to a fourth modification.

The downstream inclined portion 63 of each first rib 60 and the upstream inclined portion 72 of the corresponding second rib 70 do not have to overlap each other in the arrangement direction. Instead, as shown in FIG. 11, the gas passage 32 may include a widened portion 32a located adjacent to the downstream inclined portions 63 between the first ribs 60 and the second rib 70. The widened portion 32a has a larger cross-sectional flow area than portions of the gas passage 32 where the downstream inclined portions 63 are disposed. The widened portion 32a of this modification is a portion of the gas passage 32 where the first rib 60 or the second rib 70 is not disposed.

Figure 12:
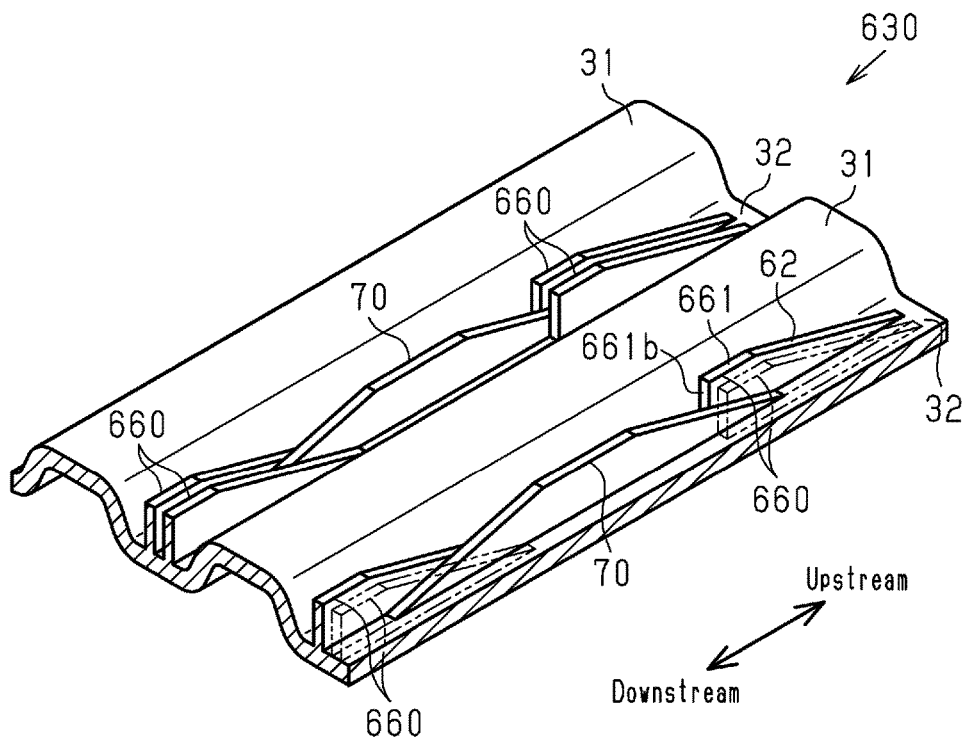
FIG. 12 is a perspective view showing the separator for the fuel cell according to a fifth modification.

As shown in FIG. 12, first ribs 660 that do not respectively include the downstream inclined portions 63 may be employed. In this case, a tip surface 661b that is located at the downstream end of each extension 661 and is orthogonal to the extending direction corresponds to the separated portion. Even this structure provides the above-described advantage (1).

As long as the downstream edge 72b of the upstream inclined portion 72 of each second rib 70 is located downstream of the upstream edge 63a of the downstream inclined portion 63 of the corresponding first rib 60A, the downstream edge 72b may be located upstream of the downstream edge 63b of the downstream inclined portion 63 of the first rib 60A. Even in this case, at least part of the upstream inclined portion 72 of the second rib 70 is located downstream of at least part of the downstream inclined portion 63 of the first rib 60. Thus, the above-described advantage (1) is provided.

The downstream inclined portion 63 of each first rib 60A may include steps so as to be step-shaped as viewed in the arrangement direction. Even in this case, the downstream inclined portion 63 gradually becomes farther from the power generation portion 11 toward the downstream side. Thus, the above-described advantage (1) is provided.

The number of the ribs 50 on each gas passage 32 may be changed.

The inclination angle of each of the inclined portions 62, 63, 72, 73 relative to the bottom of the gas passage 32 may be changed.

The shapes of the first ribs 60 may be different from the shapes of the second ribs 70.

In the first embodiment, the first separator 30 and the second separator 40 both include the ribs 50. Instead, only the first separator 30 may include the ribs 50. Alternatively, only the second separator 40 may include the ribs 50.

The separator 120 of the second embodiment may be applied only to the anode-side separator 120 or may be applied only to the cathode-side separator 120.

The separator 20 may be made of a metal material (e.g., stainless steel).

The modifications of the first embodiment may be employed as the modifications of the second embodiment. In this case, the components of the first embodiment simply need to be replaced with those of the second embodiment (e.g., "rib" of each modification of the first embodiment simply needs to be replaced with "protrusion"). However, this is not applicable to the first modification.

REFERENCE SIGNS LIST

11) Power Generation Portion
20, 120) Separator
30, 130, 230, 330, 430, 530, 630) First Separator
31, 131) Protrusion
31a) Top Surface
32, 132) Gas Passage
50) Rib
60, 60A, 60B, 260, 460, 660) First Rib
61a, 261a) Protruding End Surface
61, 261, 461, 661) Extension
62, 262, 462) Upstream Inclined Portion 63, 263, 463) Downstream Inclined Portion
70, 270, 470) Second Rib
71a, 271a) Protruding End Surface
71, 271, 471) Extension
72, 272, 472) Upstream Inclined Portion
73, 273, 473) Downstream Inclined Portion
180, 180A, 180B) First Protrusion
181) Extension
181a) Protruding End Surface
182) Upstream Inclined Portion
183) Downstream Inclined Portion
190) Second Protrusion
191) Extension
191a) Protruding End Surface
192) Upstream Inclined Portion
193) Downstream Inclined Portion

The invention claimed is:

1. A separator for a fuel cell, the separator being configured to contact a power generation portion of the fuel cell, the separator comprising:
    protrusions that extend in parallel and are spaced apart from each other, the protrusions being configured to contact the power generation portion; and
    a gas passage that extends between two adjacent ones of the protrusions along the protrusions, the gas passage being configured to allow reactant gas to flow through the gas passage, wherein
    an upstream side and a downstream side in a flow direction of the reactant gas flowing through the gas passage are referred to as an upstream side and a downstream side, respectively,
    the gas passage includes ribs that protrude toward the power generation portion and extend in an extending direction of the gas passage,
    the ribs include first ribs and a second rib, the first ribs being arranged in parallel and spaced apart from each other in an arrangement direction of the protrusions, and the second rib being located between adjacent ones of the first ribs in the arrangement direction,
    a downstream end of each of the first ribs includes a separated portion separated from the power generation portion,
    an upstream end of the second rib includes an inclined portion inclined so as to become closer to the power generation portion toward the downstream side,
    at least part of the inclined portion is located downstream of at least part of the separated portion, and
    the separated portion of one of the adjacent ones of the first ribs is in contact with the inclined portion of the second rib from one side in the arrangement direction, and the separated portion of the other one of the adjacent ones of the first ribs is in contact with the inclined portion of the second rib from the other side in the arrangement direction.

2. The separator for the fuel cell according to claim 1, wherein the separated portion is inclined so as to become farther from the power generation portion toward the downstream side.

3. The separator for the fuel cell according to claim 1, wherein a protruding end surface of each of the first ribs and a top surface of a corresponding one of the protrusions are coplanar.

4. The separator for the fuel cell according to claim 1, wherein an entirety of a protruding end surface of each of the ribs is located between a top surface of a corresponding one of the protrusions and a bottom of the gas passage in a protruding direction of the protrusions.

5. The separator for the fuel cell according to claim 1, wherein the arrangement direction is orthogonal to the extending direction.

6. A separator for a fuel cell, the separator being configured to contact a power generation portion of the fuel cell, the separator comprising:
    protrusions that extend in parallel and are spaced apart from each other, the protrusions being configured to contact the power generation portion; and
    a gas passage that extends between two adjacent ones of the protrusions along the protrusions, the gas passage being configured to allow reactant gas to flow through the gas passage, wherein
    an upstream side and a downstream side in a flow direction of the reactant gas flowing through the gas passage are referred to as an upstream side and a downstream side, respectively,
    the protrusions include first protrusions and a second protrusion, the first protrusions being arranged in parallel and spaced apart from each other, and the second protrusion being located between adjacent ones of the first protrusions in an arrangement direction of the first protrusions,
    a downstream end of each of the first protrusions includes a separated portion separated from the power generation portion,
    an upstream end of the second protrusion includes an inclined portion inclined so as to become closer to the power generation portion toward the downstream side,
    at least part of the inclined portion is located downstream of at least part of the separated portion, and
    the separated portion of one of the adjacent ones of the first protrusions is in contact with the inclined portion of the second protrusion from one side in the arrangement direction, and the separated portion of the other one of the adjacent ones of the first protrusions is in contact with the inclined portion of the second protrusion from the other side in the arrangement direction.

7. The separator for the fuel cell according to claim 6, wherein the separated portion is inclined so as to become farther from the power generation portion toward the downstream side.

8. The separator for the fuel cell according to claim 6, wherein the arrangement direction is orthogonal to an extending direction of the gas passage.

* * * * *